Figure 2:
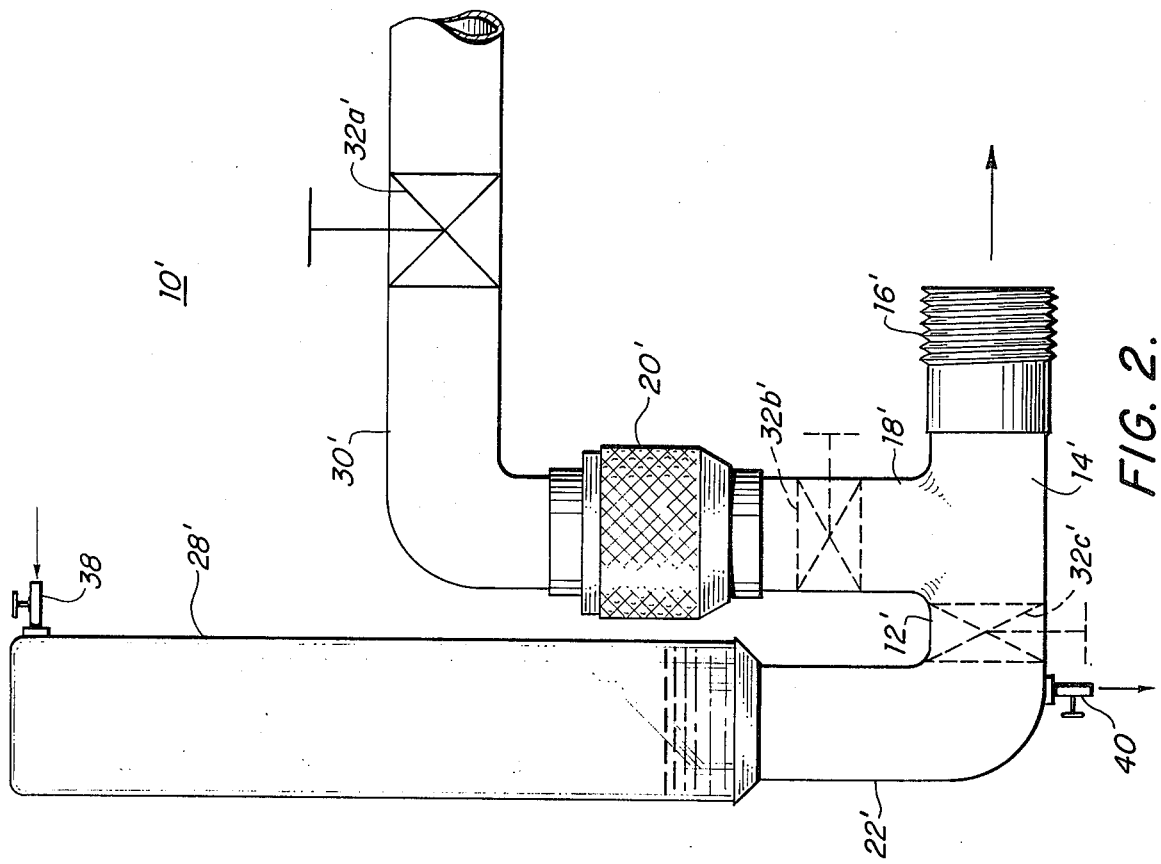

United States Patent [19]
Tobin

[11] 3,942,549
[45] Mar. 9, 1976

[54] WATER HAMMER ARRESTOR

[76] Inventor: Morris Tobin, 2 Tami Lane, Burlington, Mass. 01803

[22] Filed: June 17, 1974

[21] Appl. No.: 464,797

[52] U.S. Cl. ............................................. 137/207
[51] Int. Cl.² ...................................... F16L 55/04
[58] Field of Search ....... 137/207, 211, 568; 138/26

[56] References Cited
UNITED STATES PATENTS

| | | | |
|---|---|---|---|
| 1,898,337 | 2/1933 | Brooks | 137/211 |
| 2,881,782 | 4/1959 | Nash | 137/211 |
| 3,137,316 | 6/1964 | Everett | 137/207 X |

FOREIGN PATENTS OR APPLICATIONS

| | | | |
|---|---|---|---|
| 36,455 | 8/1886 | Germany | 138/26 |
| 318,142 | 10/1930 | United Kingdom | 138/26 |

Primary Examiner—Alan Cohan
Attorney, Agent, or Firm—Joseph S. Iandiorio

[57] ABSTRACT

A rechargeable water hammer noise suppressor comprising a junction member having a first section including a first connector for coupling the junction member to a water supply; a second section including a second connector for coupling the junction member to a water consuming device; a third section; a small upright sealed chamber containing a volume of air interconnected with the third section; and means for replenishing the air in the chamber.

5 Claims, 4 Drawing Figures

3,942,549

WATER HAMMER ARRESTOR

FIELD OF INVENTION

This invention relates to a rechargeable water hammer noise suppressor which is manually or automatically rechargeable, and more particularly to a portable rechargeable water hammer noise suppressor.

BACKGROUND OF INVENTION

Conventional water hammer arrestors or noise suppressors generally are of two types. One class, the mechanical arrestors typically are permanently installed in a system and are designed for high pressure systems. Their ability to operate over a wide range of line pressure is not one of their best features. Such inflexibility with respect to varying line pressure can be a drawback in areas where the municipal water pressure can vary widely from 60–125 psi peak load to low levels. Some mechanical arrestors operate at such high line pressure that special means are required for introducing high pressure air or other fluid into their damping system. The other class of arrestors are also typically permanently installed but are quite a bit simpler. This class of arrestors relys on a column of air to damp the shock waves in the water line. However, after a period of time the air becomes absorbed by the water and the damping is no longer effective. Rejuvenation can only be accomplished by having a plumber disconnect the arrestor, bleed it, replenish the air and reconnect the arrestor to the system. Presently, perhaps in the interest of economy, home water systems are often built without any arrestors. With no arrestor in a system, machines such as dishwashers, washing machines and other water consuming devices such as hoses, sinks and the like, can cause shock waves, water hammering, which over a sufficient period of time can loosen supports and joints and cause leaking. One serious shortcoming of both of these classes is that once installed they cannot be easily relocated. As a result water consuming devices added on to the water supply which become a source of shock waves (water hammer) are often located a substantial distance from the arrestor.

SUMMARY OF INVENTION

It is therefore an object of this invention to provide a small, simple, inexpensive, extremely effective rechargeable water hammer noise suppressor which may be installed and maintained easily and inexpensively by a user without the help of a professional plumber and which operates effectively over a wide range of line pressure.

It is a further object of this invention to provide such a suppressor which is portable and can be installed as close as practicable to a device which is causing shock waves.

It is a further object of this invention to provide such a suppressor in which the air may be easily replenished manually or automatically.

It is a further object of this invention to provide such a suppressor in which the air may be replenished automatically at higher than atmospheric pressure.

The invention results from the realization that a water hammer arrestor may be made either manually or automatically rechargeable and can be made portable with the use of provisional connectors to connect the suppressor in a water line.

The invention features a rechargeable water hammer noise suppressor comprising a junction member having a first section including a first connector for coupling the junction member to a water supply and a second section with a second connector for coupling the junction member to a water consuming device. The junction member also includes a third section and a small upright sealed chamber containing a volume of air interconnected with the third section and means for replenishing the air in the chamber.

In preferred embodiments the water hammer noise suppressor may be made portable through the use of provisional connectors for interconnecting with the water supply and the water consuming device. Further the means for replenishing the air supply may include a water bleed valve proximate the bottom of the chamber and air inlet valve proximate the top or may include a third provisional connector in the third section and a fourth provisional connector included with the chamber for coupling the chamber to the third connector and permitting the seal between the chamber and the third section to be broken periodically to replenish the air in the chamber. A supply valve may be provided for selectively isolating the chamber from the water supply valve during the period when the air in the chamber is being replenished. In other preferred embodiments air may be replenished automatically by means of an intake valve and a venturi throat in line between the first connector and the second connector for drawing air into the member to replenish the air in the chamber.

DISCLOSURE OF PREFERRED EMBODIMENT

Figure 1:
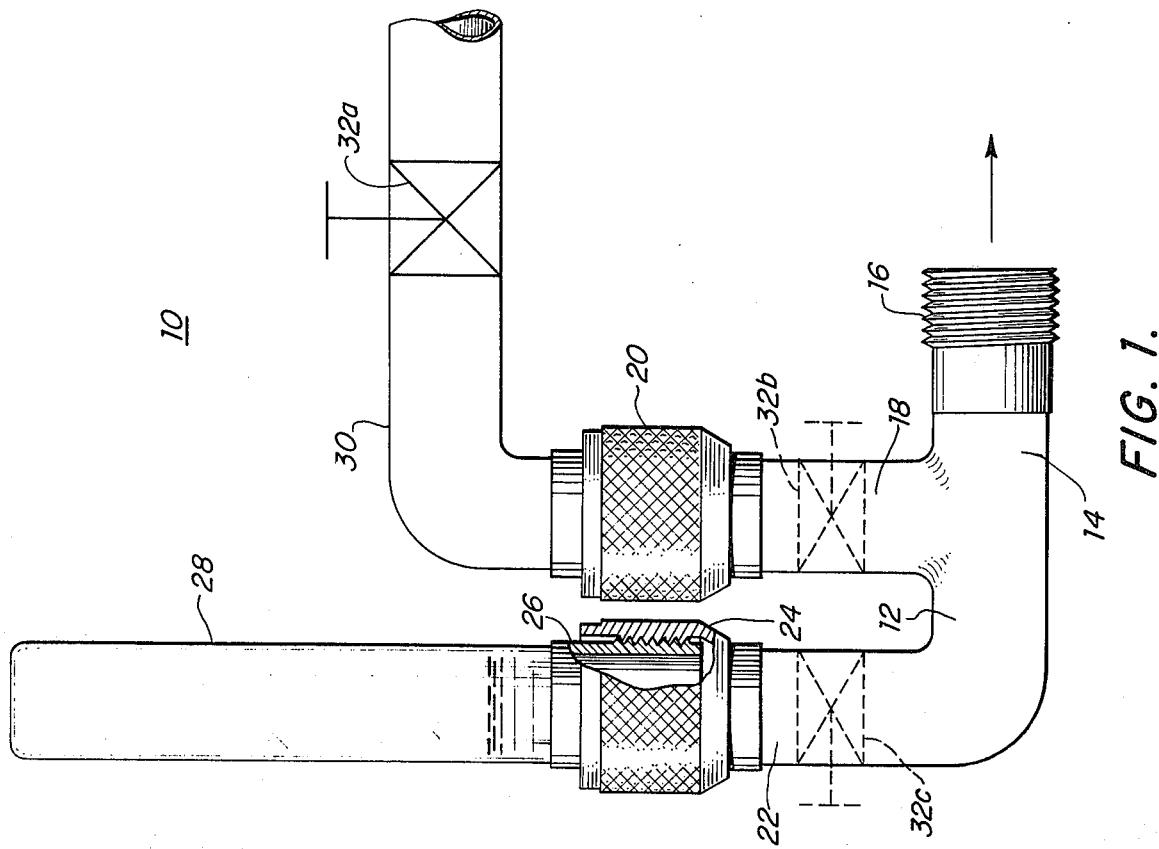
Figure 3:
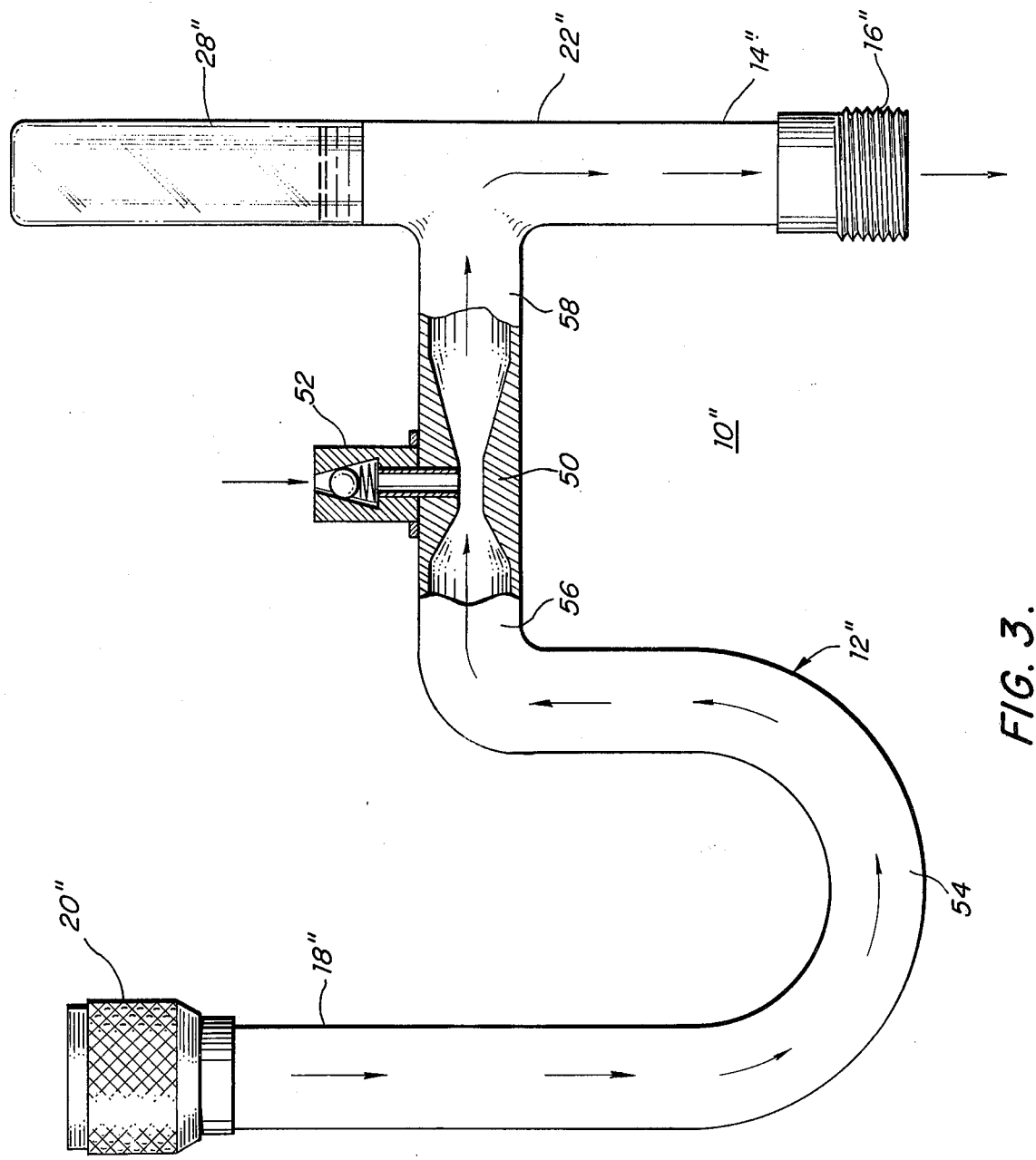
Figure 4:
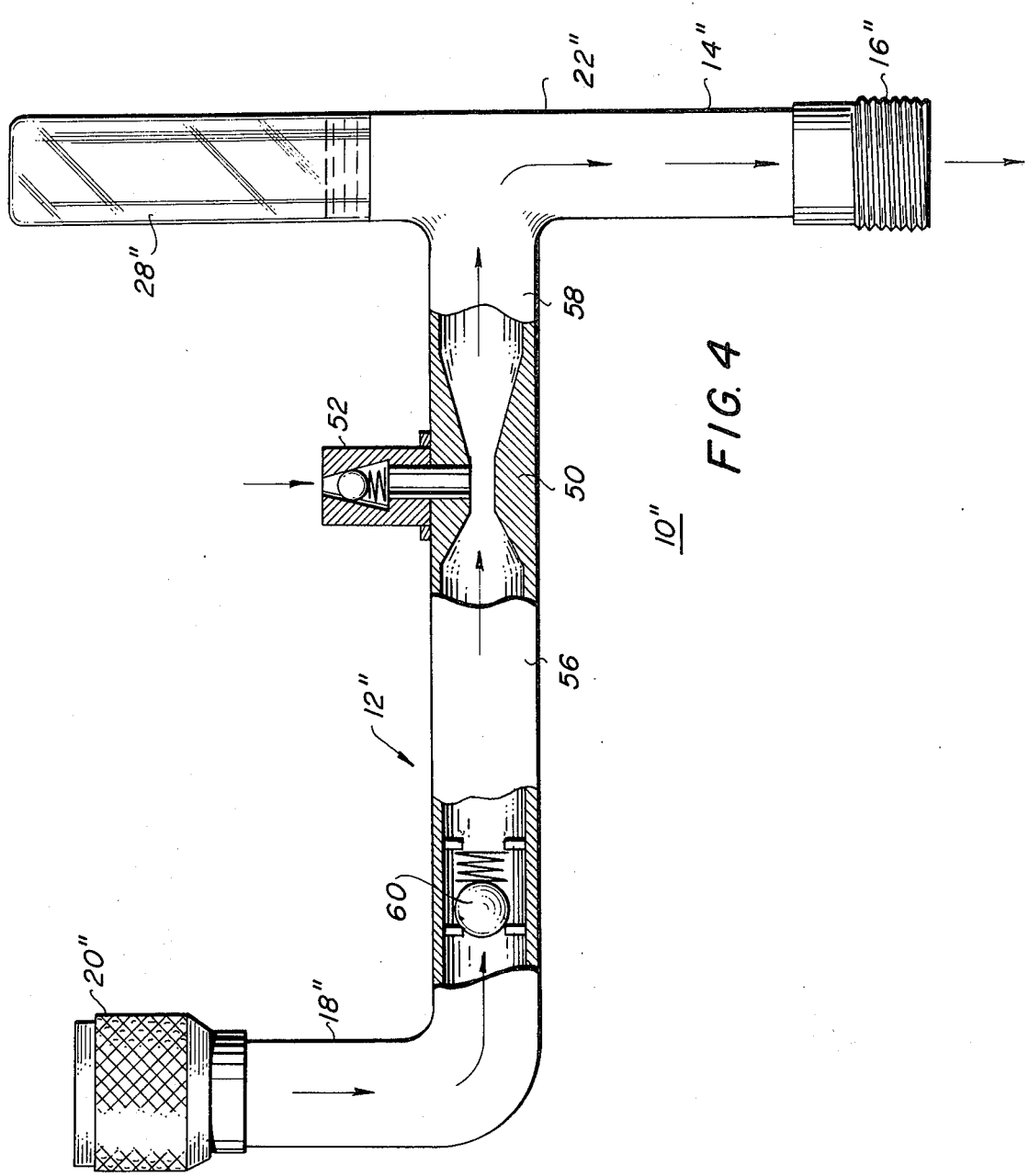

Other objects, features and advantages will occur from the following description of a preferred embodiment and the accompanying drawings, in which:

FIG. 1 is a diagrammatic elevational view with portions shown in section of a water hammer arrestor according to this invention;

FIG. 2 is a diagrammatic elevational view with portions shown in section of a water hammer arrestor according to this invention similar to that shown in FIG. 1 illustrating an alternative structure for recharging the air in the chamber; and FIG. 3 is a diagrammatic, elevational view with portions shown in section of a water hammer noise suppressor according to this invention similar to those shown in FIGS. 1 and 2 but having an automatic means of replenishing the air in the chamber; and FIG. 4 is a diagrammatic, elevational view similar to FIG. 3 showing an alternative backflow arresting means.

The invention may be achieved by a water hammer noise suppressor which includes a junction member having a first section with a first connector for connection to a water supply and a second section having a second connector for connection to a water consuming device: washing machine, dishwasher, garden hose, sink or other similar device. The junction member has a third section and an upright, sealed chamber containing a volume of air interconnected with the third section, and there are means for replenishing the air in the chamber.

In one embodiment the third section includes a third connector means and the air chamber includes a fourth connector means for sealingly interconnecting with the third connector. The replenishment of the air within the chamber is accomplished by partially or completely disconnecting the third and fourth connectors in order to break the seal so that the water in the chamber can leak out and air can leak in. During this replenishment operation a valve, which may be either a valve provided in the junction member or a valve or faucet in the water supply to which the junction member is connected, is closed while the seal between the chamber and the third section is broken.

Alternatively, the air chamber can be bled by means of an air inlet valve proximate the top of the chamber and a water bleed valve at the bottom of the chamber or somewhere proximate the bottom of the chamber in the third section or elsewhere in the junction member.

An automatic air replenishing suppressor may be made by providing a check valve and a venturi throat in the junction member between the water supply and the water consuming device so that air drawn through the check valve by the action of the venturi will be carried by the water stream past the air chamber as the water moves toward the water consuming device. As a result a substantial amount of the air bubbles will be trapped in the air chamber. A back flow preventing mechanism such as a conventional plumbers trap or check valve is advantageously placed between the venturi throat and the connection to the water supply in order to prevent air from backing up into the water supply.

The air chamber may be made transparent or translucent in order that the amount of air may be easily observed. When used as a portable or provisional suppressor the junction member may use provisional connectors to interconnect with the water supply and the water consuming device and to interconnect the air chamber with the junction member.

The invention may be accomplished by water hammer noise suppressor 10, FIG. 1, including a junction member 12 having a first section or conduit 14 which includes a connector 16 and a second section or conduit 18 including connector 20; a third section or conduit 22 is provided with a connector 24 that interconnects with connector 26 on the bottom of air chamber 28. In use connector 16 is connected to a water consuming device such as a washing machine while connector 20 is connected to a water supply such as a faucet or pipe 30. Connectors 24 and 26 are sealingly interconnected to trap air in chamber 28.

In operation a water supply valve such as valve 32a in the water supply line or valve 32b or 32c variously located in junction member 12, is closed to stop water flow into junction member 12. Connectors 26 and 24 are then partially or completely disconnected to break the seal and permit any water which has collected in air chamber 28 to leak out while the air is replenished.

Alternatively, as shown in FIG. 2, where like parts have been given like numbers primed, junction member 12' includes an air inlet valve 38 proximate the top of chamber 28' and a water bleed valve 40 proximate the bottom of air chamber 28'. In suppressor 10', FIG. 2, connectors 24 and 26 have been eliminated since they are made unnecessary by the presence of valves 38 and 40.

The automatic replenishment of air is accomplished by suppressor 10'', FIG. 3, where like parts have been given like numbers double primed with respect to FIGS. 1 and 2. Junction member 12'' includes a venturi throat 50 disposed between conduit 18'' interconnected to the water supply and conduit 14'' interconnected with the water consuming device. A check valve 52 enables air to be drawn in by the action of the water as it passes from conduit 18'' through the rest of junction member 12'' and out conduit 14'' as indicated by the arrows. The air entrapped as bubbles in the water is carried with the stream as it moves through conduit 14''. Conduit 22'', adjacent the air chamber 28'' acts as an abutment for the water and entrained air, permitting some of the air bubbles to rise in conduit 22'' into air chamber 28'' where they are trapped to provide a damping action to prevent shock waves or water hammering. A trap 54 may be provided between throat 50 and conduit 18'' to prevent air bubbles, stagnated in areas 56 and 58 when the flow has stopped, from moving backwards up conduit 18'' into the water supply. Alternatively, FIG. 4, a check valve 60 may be used in place of trap 54. One advantage of this automatic replenishment structure, in addition to relieving the user of periodically checking and bleeding the system, is that air introduced into the stream by the venturi throat 50 is not introduced at atmospheric pressure but at a higher pressure e.g. 25 or 30 psi as determined by the flow into the water consuming device installed at connector 16''. As a result the air trapped in air chamber 28'' is at a higher pressure relative to the line pressure and will provide a firmer damping action to suppress or arrest the water hammer and the attendant noise.

Other embodiments will occur to those skilled in the art and are within the following claims:

What is claimed is:

1. An automatically rechargeable water hammer suppressor adapted to be placed between a pressurized water supply line and a water consuming device comprising an inlet portion, an outlet portion and an intermediate member interconnecting said inlet and outlet portion; said intermediate member including a venturi throat, an air inlet passage extending through said intermediate member to said venturi throat, and an air inlet valve in said air inlet passage for drawing air into the water flowing through said venturi throat in said intermediate member; and an air chamber extending upward from said intermediate member and connected with said intermediate member downstream of said venturi throat between said venturi throat and said outlet member, for receiving air at increased pressure greater than atmospheric introduced by said venturi throat.

2. The suppressor of claim 1 further including an air backflow arrestor in said intermediate member between said venturi throat and said inlet portion.

3. The suppressor of claim 2 in which said air backflow arrestor includes a check valve.

4. The suppressor of claim 2 in which said air backflow arrestor includes a trap.

5. An automatically rechargeable water hammer suppressor adapted to be placed between a pressurized water supply line and a water consuming device comprising an inlet portion, an outlet portion and an intermediate member interconnecting said inlet and outlet portion; said intermediate member including a venturi throat, an air inlet passage extending through said intermediate member to said venturi throat, and an air inlet valve in said air inlet passage for drawing air into the water flowing through said venturi throat in said intermediate member; and an air chamber extending upward from said intermediate member and connected with said intermediate member downstream of said venturi throat between said venturi throat and said outlet member, said intermediate member having an abutment downstream of said venturi throat and positioned adjacent to said air chamber, whereby air in the water is released from the water and flows into said air chamber under pressure greater than atmospheric.

* * * * *